US009765900B2

(12) United States Patent
Arai

(10) Patent No.: US 9,765,900 B2
(45) Date of Patent: Sep. 19, 2017

(54) MOTOR-DRIVEN VALVE

(71) Applicant: FUJIKOKI CORPORATION, Setagaya-ku, Tokyo (JP)

(72) Inventor: Yusuke Arai, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 15/139,712

(22) Filed: Apr. 27, 2016

(65) Prior Publication Data

US 2016/0369911 A1    Dec. 22, 2016

(30) Foreign Application Priority Data

Jun. 22, 2015  (JP) .................................. 2015-124706

(51) Int. Cl.
| F16K 31/04 | (2006.01) |
| F25B 41/06 | (2006.01) |
| F16H 25/20 | (2006.01) |
| F16K 1/12 | (2006.01) |

(52) U.S. Cl.
CPC ........... *F16K 31/047* (2013.01); *F16H 25/20* (2013.01); *F16K 1/12* (2013.01); *F25B 41/062* (2013.01); *F16H 2025/2087* (2013.01); *F25B 2341/0653* (2013.01)

(58) Field of Classification Search
CPC .......... F16K 31/047; F16K 1/12; F16H 25/20; F16H 2025/2087; F25B 41/062; F25B 2341/0653
See application file for complete search history.

(56) References Cited

U.S. PATENT DOCUMENTS

| 2,930,571 A | 3/1960 | Vogl | |
| 3,295,385 A | 1/1967 | Jenny | |
| 3,730,016 A | 5/1973 | Miller | |
| 6,561,480 B1 * | 5/2003 | Komiya | F16K 1/38 251/129.11 |
| 6,923,427 B2 * | 8/2005 | Yonezawa | F16K 31/105 251/129.11 |
| 7,325,780 B2 * | 2/2008 | Arai | F16K 31/04 251/129.11 |

(Continued)

FOREIGN PATENT DOCUMENTS

| EP | 1903266 | 3/2008 |
| JP | 2012-197849 | 10/2012 |

(Continued)

OTHER PUBLICATIONS

European Search Report relating to co-pending European Patent Application No. 16162883, dated Nov. 17, 2016, 3 Pages.

*Primary Examiner* — Eric Keasel
(74) *Attorney, Agent, or Firm* — McCarter & English, LLP

(57) ABSTRACT

Provided is a motor-driven valve with a simple configuration that can solve hysteresis generated when the rotary direction changes, without greatly changing a conventional motor-driving valve. A friction angle of an external thread and an internal thread of a thread feeding mechanism, a lead angle thereof, and a biasing force of a compression coil spring inserted between a valve shaft and a valve body are set so as to always bias the valve shaft making up the thread feeding mechanism to the valve body in a rotating direction in one direction or in the other direction in both of the upward-moving stroke and the downward-moving stroke.

3 Claims, 3 Drawing Sheets

(56) References Cited

U.S. PATENT DOCUMENTS

| | | | | |
|---|---|---|---|---|
| 7,523,917 B2* | 4/2009 | Arai | ......................... | F16K 31/04 |
| | | | | 251/129.11 |
| 7,758,013 B2* | 7/2010 | Arai | ......................... | F16K 31/04 |
| | | | | 251/129.11 |
| 8,636,262 B2* | 1/2014 | Schade | .................. | F16K 31/048 |
| | | | | 251/129.11 |
| 8,794,591 B2* | 8/2014 | Arai | ......................... | F01L 1/352 |
| | | | | 251/129.11 |
| 8,851,448 B2* | 10/2014 | Harada | .................. | F16K 31/047 |
| | | | | 251/129.11 |
| 2016/0290525 A1* | 10/2016 | Hotta | ....................... | F16K 31/04 |

FOREIGN PATENT DOCUMENTS

| | | |
|---|---|---|
| JP | 2015-014306 | 1/2015 |
| WO | 2015001779 | 1/2015 |

\* cited by examiner

MOTOR-DRIVEN VALVE

CROSS-REFERENCE TO RELATED APPLICATIONS

This application claims the benefit of Japanese Patent Application No. JP 2015-124706 filed on Jun. 22, 2015, the entire content of which is incorporated herein by reference.

FIELD OF THE INVENTION

The present invention relates to motor-driven valves, and relates to a motor-driven valve to control the flow rate of fluid (refrigerant) in a heating and cooling system, for example.

BACKGROUND OF THE INVENTION

FIG. 2 shows a conventional example of this type of motor-driven valve. A motor-driven valve 1' illustrated as a conventional example basically includes a valve body 10 having a valve chamber 14 and a valve seat 15 formed inside thereof, a circular cylindrical shaped can 30 having a ceiling part that is fixed to the valve body 10 via a base plate 31, a stepping motor 63 including a stator 40 attached outside of the can 30 and a rotor 50 attached inside of the can 30, a planetary gear reduction mechanism 60 to decrease the rotation speed of the rotor 50, a valve element 21 to control the amount of fluid passing while moving close to or away from the valve seat 15, and a screw drive member 22 to convert the rotary motion of an output gear 57 of the planetary gear reduction mechanism 60 into the linear motion via a thread feeding mechanism 27 to drive the valve element 21.

The valve body 10 includes a valve port 16 defined so as to communicate with the valve chamber 14, and a pipe 11 is connected to a part thereof on the valve port 16 side, and a pipe 12 is connected so as to communicate with an opening formed at the lateral face of the valve chamber 14. A threaded bearing member 13 having an internal thread 13a formed at a lower half part thereof on the center is inserted and fitted to the upper part of the valve chamber 14 of the valve body 10, and is fixed to the valve body 10 by caulking (caulking part 17).

The stator 40 fitted to the outer circumference of the can 30 includes a yoke 41, a bobbin 42, a coil 43, a resin mold 44 and the like, and the rotor 50 rotatably (without moving vertically) supported inside of the can 30 is made up of a circular cylindrical rotor member 51 made of a magnetic material and a sun gear member 52 made of a resin material that are coupled integrally. A shaft 62 is inserted at a center part of the sun gear member 52, and an upper part of the shaft 62 is supported by a supporting member 61 disposed inside of the top part of the can 30.

The sun gear member 52 has a sun gear 53 that meshes with a plurality of planetary gears 55 that is rotatably supported by shafts 56 provided at a carrier 54 placed on the bottom face of the output gear 57. The upper half of each planetary gear 55 meshes with an annular ring gear (fixed internal gear) 58 attached by caulking to the upper part of a circular cylindrical member 18 fixed to the upper part of the valve body 10, and the lower half of the planetary gear 55 meshes with an internal gear 57a of the annular output gear 57. The ring gear 58 and the internal gear 57a of the output gear 57 have slightly different numbers of teeth, whereby the number of rotations of the sun gear 53 is transmitted to the output gear 57 at a large reduction gear ratio (such a structure of the gears is called a mechanical paradox planetary gear reduction mechanism 60).

The output gear 57 slidably comes into contact with the upper face of the threaded bearing member 13, and the upper part of a stepped circular cylindrical output shaft 59 is press-fitted to the center of the bottom part of the output gear 57, whereas the lower part of the output shaft 59 is rotatably inserted into an insertion hole 13b formed at the upper half of the center part of the threaded bearing member 13. Then, the lower part of the shaft 62 is fitted to the upper part of the output shaft 59.

The internal thread 13a of the threaded bearing member 13 threadably engages with an external thread 22a of the screw drive member 22 (this may be called a driver as well) making up a valve shaft 20, and the screw drive member 22 converts the rotary motion of the output gear 57 (i.e., the rotor 50) into the linear motion in the direction of axis line O (vertically ascending/descending direction) through the thread feeding mechanism 27 including the external thread 22a and the internal thread 13a. Herein, the output gear 57 rotates at a fixed position in the direction of axis line O without moving vertically, and a plate-like portion 22b having a shape like a flat-bladed driver provided at the upper end part of the screw drive member 22 is inserted into a slit-like fitting groove 59b provided at the lower end part of the output shaft 59 coupled with the output gear 57, whereby the rotary motion of the output gear 57 is transmitted to the screw drive member 22. The plate-like portion 22b of the screw drive member 22 slides in the direction of axis line O in the fitting groove 59b of the output shaft 59, whereby as the output gear 57 (rotor 50) rotates, the screw drive member 22 linearly moves in the direction of axis line O due to the thread feeding mechanism 27, although the output gear 57 does not move in the direction of rotation axis. The linear motion of the screw drive member 22 is transmitted to a shaft-like valve element 21 via a ball-shaped fitting 25 including a ball 23 and a ball receiving seat 24, so that the valve element 21 is guided by a stepped circular cylindrical spring case 19 internally fixed to the valve body 10 to move in the direction of axis line O. The space between the spring case 19 and the valve element 21 stores a compression coil spring 26 in a compressed manner so as to always bias the valve element 21 in the valve opening direction.

With this configuration, the flow passage area (valve opening degree) between the valve element 21 and the valve seat 15 changes, whereby the flow rate of refrigerant passing through the valve port 16 can be controlled.

Meanwhile, in order to allow for smooth linear motion of this screw drive member, a certain degree of gap is required at an engagement part between the plate-like portion of the screw drive member and the fitting groove of the output shaft as described above. The rotor (the output shaft coupled with the output gear) rotates in two directions to control the position of the valve element in the direction of axis line via the screw drive member, and hysteresis inevitably occurs at the rotation of the output shaft and the rotation of the screw drive member as shown in FIG. 3 due to the gap as described above when the rotation direction changes.

JP 2015-014306A and JP 2012-197849A propose prior art to solve such a problem.

According to the prior art described in JP2015-014306A, the overlap width between the lateral face of the fitting groove and the lateral face of the plate-like portion that mutually overlap when viewed from the axis direction (vertically ascending/descending direction) is set larger than the inner diameter of the internal thread of the threaded bearing member.

According to the prior art described in JP 2012-197849A, the output gear can ascend/descend in a planetary gear reduction mechanism, and the output shaft and the screw drive member are shaped integrally to form the output gear and the screw drive member integrally.

The prior art described in JP 2015-014306A, however, is configured so that rotary motion of the output gear (rotor) is transmitted to the screw drive member by engagement (mesh) of the fitting groove of the output shaft and the plate-like portion of the screw drive member, and so this cannot solve the problem on hysteresis as stated above sufficiently.

The prior art described in JP 2012-197849A has the possibility of increasing the overall height to keep the strength of the output gear when the gear descends in the planetary gear reduction mechanism, and it has to additionally include a disc spring, for example, to control the position of the rotor in the axis direction, which means a complicated structure.

SUMMARY OF THE INVENTION in view of these problems, the present invention aims to provide a motor-driven valve with a simple configuration that can solve hysteresis generated when the rotary direction changes, without greatly changing a conventional motor-driving valve.

To solve the above-stated problems, a motor-driven valve according to the present invention includes: a valve body having a valve chamber and a valve seat; a valve shaft having a valve element that ascends and descends with respect to the valve seat; and a motor including a rotor that rotates without ascending/descending with respect to the valve body and a stator to rotate the rotor; a reduction mechanism inserted between the rotor and the valve shaft; a thread feeding mechanism disposed between the valve shaft and the valve body so as to, as the rotor rotates, make the valve shaft ascend/descend with respect to the valve body; a slide mechanism disposed between the valve shaft and the reduction mechanism so as to allow for ascending/descending motion of the valve shaft with respect to the valve body; and a biasing member inserted between the valve shaft and the valve body. The motor-driven valve is configured to perform an upward-moving stroke such that, by rotating the rotor in one direction, the valve shaft ascends with respect to the valve body while rotating due to the thread feeding mechanism, and a downward-moving stroke such that, by rotating the rotor in the other direction, the valve shaft descends with respect to the valve body while rotating due to the thread feeding mechanism, and a friction angle of a thread part of the thread feeding mechanism, a lead angle thereof, and a biasing force of the biasing member are set so as to always bias the valve shaft to the valve body in a rotating direction in one direction or in the other direction in the upward-moving stroke and the downward-moving stroke.

In a preferable embodiment, the slide mechanism includes an engagement mechanism to rotate the valve shaft with rotation of the rotor.

In more preferable embodiment, the engagement mechanism includes a plate-like portion disposed at the valve shaft, and a fitting groove disposed at an output shaft of the reduction mechanism, to which the plate-like portion is fitted and inserted so as to be movable up and down.

According to the present invention, a friction angle of a thread part of the thread feeding mechanism, a lead angle thereof, and a biasing force of the biasing member inserted between the valve shaft and the valve body are set so as to always bias the valve shaft making up the thread feeding mechanism to the valve body in a rotating direction in one direction or in the other direction in both of the upward-moving stroke and the downward-moving stroke, and therefore the gap at the engagement part between the fitting groove and the plate-like portion, for example, can be always filled. Therefore the rotary motion of the output gear (rotor) can be directly transmitted to the screw drive member without influences from the gap when the rotation direction changes (i.e., switching between the upward-moving stroke and the downward-moving stroke), whereby hysteresis of the flow-rate characteristics generated when the rotation direction changes can be solved reliably.

DETAILED DESCRIPTION OF THE INVENTION

Figure 1:
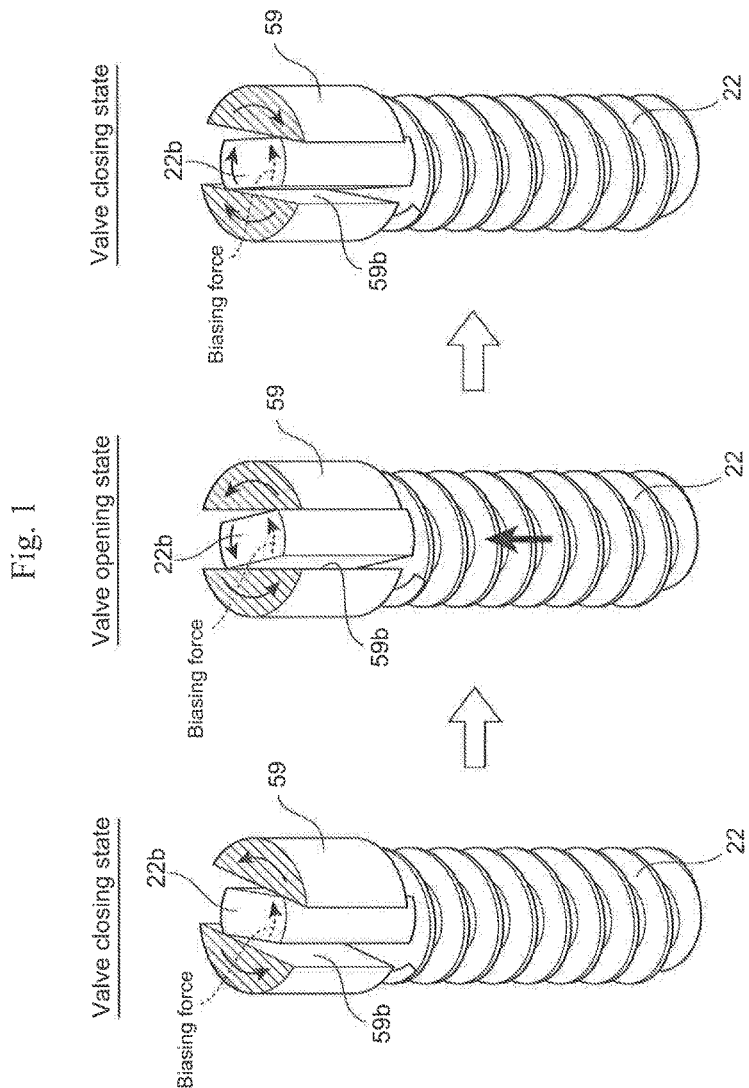
FIG. 1 is an enlarged perspective view of a major part in one embodiment of the motor-driven valve of the present invention to describe a change in state of the engagement mechanism.

The following describes an embodiment of a motor-driven valve according to the present invention, with reference to the drawings. Note here that the gap between components and the distance between components may be enlarged for easy understanding of the present invention or for convenience of drawing.

For the motor-driven valve of the present embodiment described below, the same reference numerals as those of the motor-driven valve 1' as a conventional example shown in FIGS. 2 and 3 as described above are assigned to the corresponding parts to omit their detailed descriptions, and the following mainly describes their differences.

FIG. 1 is an enlarged perspective view of a major part in one embodiment of the motor-driven valve of the present invention to describe a change in state of the engagement mechanism.

Figure 2:
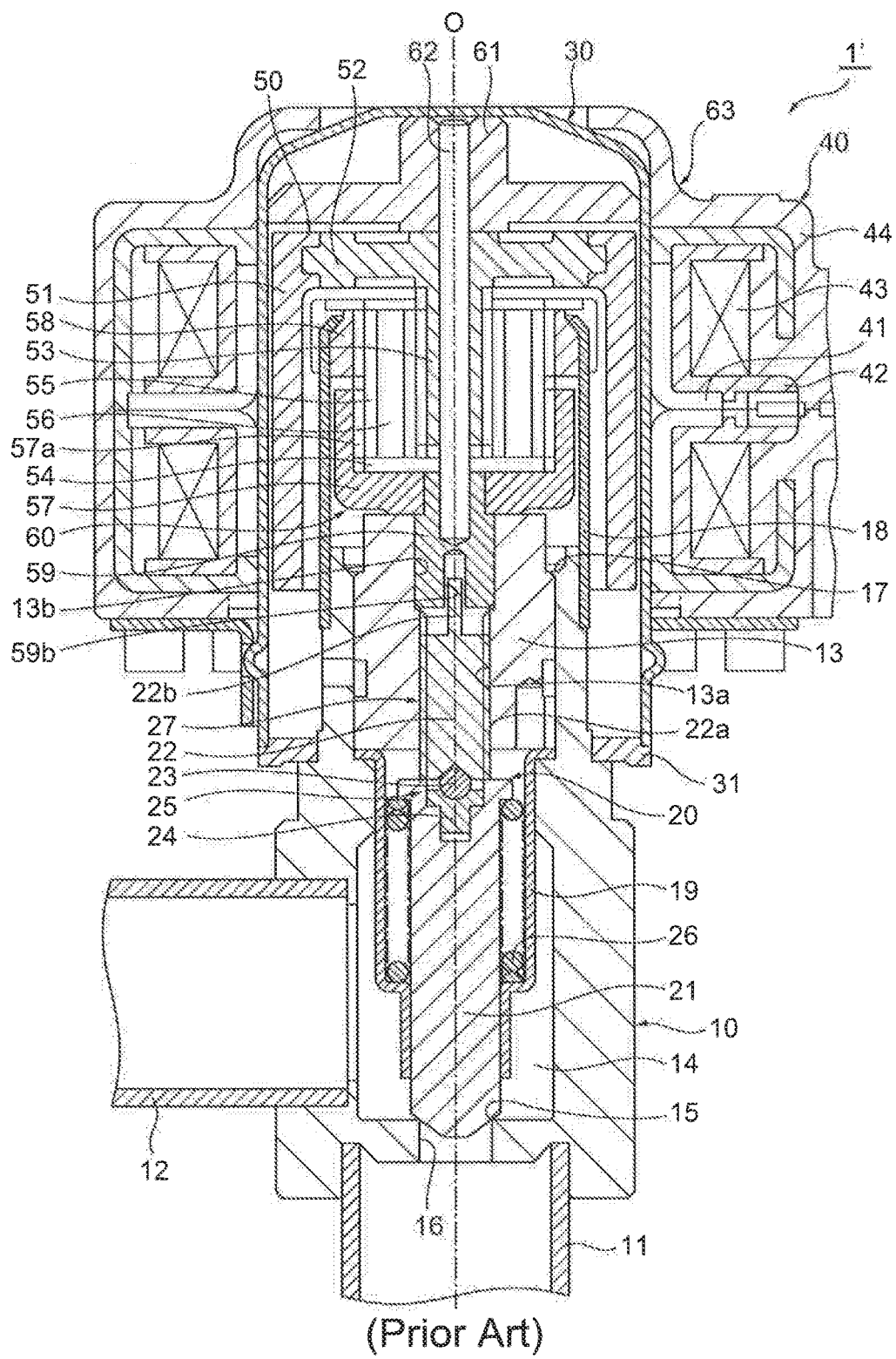
FIG. 2 is a longitudinal sectional view showing a conventional motor-driven valve.
Figure 3:
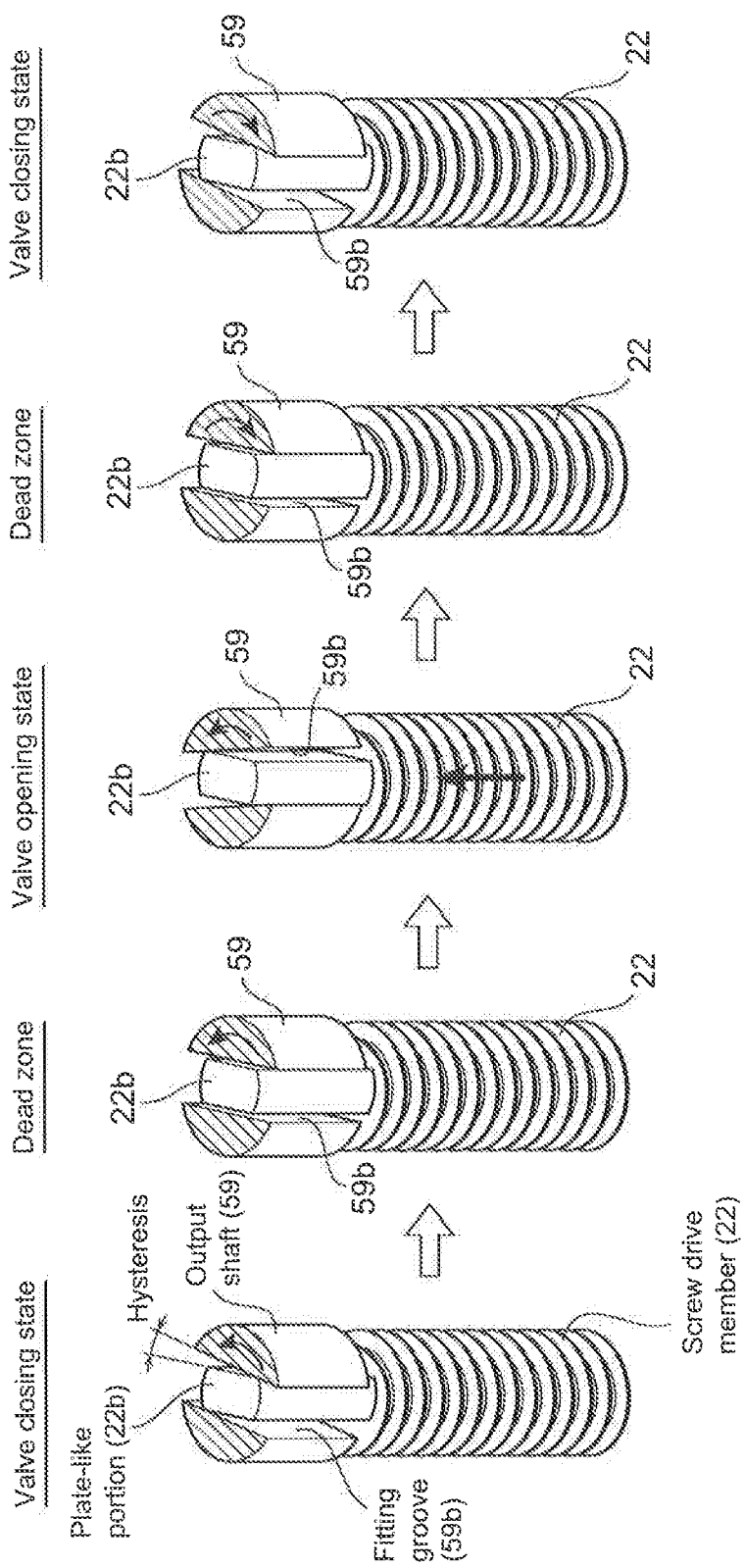
FIG. 3 is an enlarged perspective view of a major part in the conventional motor-driven valve in FIG. 2 to describe a change in state of the engagement mechanism.

A motor-driven valve of the present embodiment has a basic configuration that is almost the same as the motor-driven valve 1' of a conventional example shown in FIG. 2, and so the illustration is omitted. The motor-driven valve mainly includes a valve body 10 having a valve chamber 14 and a valve seat 15, a valve shaft 20 including a valve element 21 that is disposed in the valve chamber 14 and ascends/descends with respect to the valve seat 15 and a screw drive member 22 coupled with the valve element 21 via a ball shaped fitting 25, a stepping motor 63 including a rotor 50 that rotates without ascending/descending (without moving vertically) with respect to the valve body 10 and a stator 40 to rotate the rotor 50, a planetary gear reduction mechanism 60 inserted between the rotor 50 and the valve shaft 20, a thread feeding mechanism 27 disposed between the valve shaft 20 and the valve body 10 so as to, as the rotor 50 rotates, make the valve shaft 20 ascend/descend while rotating with respect to the valve body 10, a slide mechanism disposed between the valve shaft 20 and the planetary gear reduction mechanism 60 so as to allow for ascending/descending motion of the valve shaft 20 with respect to the valve body 10, and a compression coil spring 26 inserted between the valve shaft 20 and the valve body 10.

As mentioned above, the thread feeding mechanism 27 includes an internal thread 13*a* formed on the inner periphery of a threaded bearing member 13 that is fixed to the upper part of the valve chamber 14 of the valve body 10, and an external thread 22*a* formed on the outer circumference of the screw drive member 22.

As the rotor 50 (output shaft 59) rotates, a plate-like portion 22*b* that protrudes from the screw drive member 22 slides in the fitting groove 59*b* of the output shaft 59 in the direction of axis line O (ascending/descending direction), whereby the screw drive member 22 linearly moves in the ascending/descending direction with respect to the valve body 10 or the like. This makes up the slide mechanism that allows for the ascending/descending motion of the valve shaft 20 with respect to the valve body 10 as the rotor 50 rotates. As this slide mechanism, a mechanism as shown in JP 2012-197849A, for example, may be used, including the output gear 57 or the like in the planetary gear reduction mechanism 60 that moves in the planetary gear reduction mechanism 60 in the ascending/descending direction with respect to the planetary gear 55 or the like. In the conventional example, the output shaft 59 coupled with the output gear 57 includes the fitting groove 59*b*, and the screw drive member 22 includes the plate-like portion 22*b*. Conversely, the output shaft 59 may include a plate-like portion and the screw drive member 22 may include a fitting groove.

The thus configured motor-driven valve performs an upward-moving stroke such that as the rotor 50 rotates in one direction (e.g., counterclockwise), the rotation of the rotor 50 is transmitted to the valve shaft 20 in a reduction manner via the output shaft 59 of the planetary gear reduction mechanism 60, and then the valve shaft 20 (the screw drive member 22 thereof) ascends while rotating due to the thread feeding mechanism 27 with respect to the valve body 10 (the threaded bearing member 13 thereof) so as to separate the valve element 21 away from the valve seat 15, and performs a downward-moving stroke such that as the rotor 50 rotates in the other direction (e.g., clockwise), the rotation of the rotor 50 is transmitted to the valve shaft 20 in a reduction manner via the output shaft 59 of the planetary gear reduction mechanism 60, and then the valve shaft 20 (the screw drive member 22 thereof) descends while rotating due to the thread feeding mechanism 27 with respect to the valve body 10 (the threaded bearing member 13 thereof) so as to bring the valve element 21 close to the valve seat 15 (e.g., finally seated).

As shown in FIG. 1, the motor-driven valve of the present embodiment is configured to set friction angles of the external thread 22*a* and the internal thread 13*a* in the thread feeding mechanism 27 and lead angles thereof (in other words, coefficients of frictions of the contact face between the external thread 22*a* and the internal thread 13*a* and the thread pitch) as well as the biasing force of the compression coil spring 26 inserted between the valve shaft 20 and the valve body 10 so as to always bias the valve shaft 20 making up the thread feeding mechanism 27 to the valve body 10 in one direction (e.g., counterclockwise) in both of the upward-moving stroke and the downward-moving stroke as stated above. In the illustrated example, the valve shaft 20 is always biased in the valve opening direction (the direction in which the biasing force of the compression coil spring 26 acts) with respect to the valve body 10 by the biasing force of the compression coil spring 26, so that the plate-like portion 22*b* of the screw drive member 22 is always pushed against the inner face of the fitting groove 39*b* of the output shaft 59 in the valve opening direction (e.g., counterclockwise) for abutting (engagement or mesh).

Therefore, in the upward-moving stroke (from valve-closing to valve-opening), as the rotor 50 rotates, the output shaft 59 rotates in the same direction as the biasing force given to the screw drive member 22 of the valve shaft 20, and the screw drive member 22 of the valve shaft 20 ascends while rotating so as to follow the rotation of the output shaft 59 while keeping the state where the plate-like portion 22*b* of the screw drive member 22 is in contact with the inner face of the fitting groove 59*b* of the output shaft 59 due to the biasing force given to the valve shaft 20.

On the contrary, in the downward-moving stroke (from valve-opening to valve-closing), as the rotor 50 rotates, the output shaft 59 rotates in the direction opposite of the biasing force given to the screw drive member 22 of the valve shaft 20. Herein, since the rotary force overcoming the biasing force given to the valve shaft 20 is transmitted from the output shaft 59 to the plate-like portion 22*b* of the screw drive member 22, the screw drive member 22 of the screw shaft 20 rotates against the biasing force given to the valve shaft 20. At this time, the screw drive member 22 of the valve shaft 20 descends while rotating together with the rotation of the output shaft 59 while keeping the state where the plate-like portion 22*b* of the screw drive member 22 is in contact with the inner face of the fitting groove 59*b* of the output shaft 59 due to the biasing force (the force in the direction opposite of the rotation direction) given to the valve shaft 20.

In this way, the motor-driven valve of the present embodiment is configured so as to always fill the gap at the engagement part between the fitting groove 59*b* of the output shaft 59 and the plate-like portion 22*b* of the screw drive member 22 of the valve shaft 20 which make up the engagement mechanism of the slide mechanism as stated above in both of the upward-moving stroke and the downward-moving stroke. Therefore the rotary motion of the output gear 57 (rotor 50) can be directly transmitted to the screw drive member 22 without influences from the gap when the rotation direction changes (i.e., switching between the upward-moving stroke and the downward-moving stroke), whereby hysteresis of the flow-rate characteristics generated when the rotation direction changes can be solved reliably.

It should be noted that the present invention is applicable to various types of motor-driven valves as well, other than the type as shown in the drawing that is configured to let a poppet type or piston type valve element seated on the valve seat to block the flow of fluid when the valve element is located at the lowermost position. For instance, the motor-driven valve may be of a valve-closing type such that, when the valve element is located at the uppermost position, the valve element is seated at a valve seat provided on the rear face side of the valve port to block the flow of fluid (in this case, a compression coil spring that biases the valve element in the valve-closing direction is inserted between the valve shaft and the valve body). The motor-driven valve may be of another type such that, while letting the valve element seated at the valve seat, a predetermined flow rate is kept via a communication hole provided at the valve element or a bleed groove provide at the valve seat, or of a closing-valve less type that keeps a predetermined flow rate because of a gap of a predetermined size between the valve element and the valve seat when the valve element is located at the lowermost position (typically in the complete closed state).

DESCRIPTION OF SYMBOLS

1' Motor-driven valve
10 Valve body

13 Threaded bearing member
13a Internal thread
14 Valve chamber
15 Valve seat
16 Valve port
17 Circular cylindrical member
18 Spring case
20 Valve shaft
21 Valve element
22 Screw drive member
22a External thread
22b Plate-like portion
26 Compression coil spring (biasing member)
27 Thread feeding mechanism
30 Can
31 Base plate
40 Stator
50 Rotor
57 Output gear
59 Output shaft
59b Fitting groove
60 Mechanical paradox planetary gear reduction mechanism
61 Supporting member
62 Shaft
63 Stepping motor

What is claimed is:

1. A motor-driven valve, comprising:
a valve body having a valve chamber and a valve seat;
a valve shaft having a valve element that ascends and descends with respect to the valve seat;
a motor including a rotor that rotates without ascending/descending with respect to the valve body and a stator to rotate the rotor;
a reduction mechanism inserted between the rotor and the valve shaft;
a thread feeding mechanism disposed between the valve shaft and the valve body so as to, as the rotor rotates, make the valve shaft ascend/descend with respect to the valve body;
a slide mechanism disposed between the valve shaft and the reduction mechanism so as to allow for ascending/descending motion of the valve shaft with respect to the valve body; and
a biasing member inserted between the valve shaft and the valve body,
wherein:
the motor-driven valve is configured to perform an upward-moving stroke such that, by rotating the rotor in one direction, the valve shaft ascends with respect to the valve body while rotating due to the thread feeding mechanism, and a downward-moving stroke such that, by rotating the rotor in the other direction, the valve shaft descends with respect to the valve body while rotating due to the thread feeding mechanism, and
a friction angle of a thread part of the thread feeding mechanism, a lead angle thereof, and a biasing force of the biasing member are set so as to always bias the valve shaft to the valve body in a rotating direction in one direction or in the other direction in the upward-moving stroke and the downward-moving stroke.

2. The motor-driven valve according to claim 1, wherein the slide mechanism includes an engagement mechanism to rotate the valve shaft with rotation of the rotor.

3. The motor-driven valve according to claim 2, wherein the engagement mechanism includes a plate-like portion disposed at the valve shaft, and a fitting groove disposed at an output shaft of the reduction mechanism, to which the plate-like portion is fitted and inserted so as to be movable up and down.

* * * * *